(12) United States Patent
Chen et al.

(10) Patent No.: US 10,867,182 B2
(45) Date of Patent: Dec. 15, 2020

(54) OBJECT RECOGNITION METHOD AND OBJECT RECOGNITION SYSTEM THEREOF

(71) Applicant: ALi Corporation, Hsinchu (TW)

(72) Inventors: Keng-Chih Chen, Hsinchu (TW); Jou-Yun Pan, Hsinchu (TW)

(73) Assignee: ALI CORPORATION, Hsinchu (TW)

( * ) Notice: Subject to any disclaimer, the term of this patent is extended or adjusted under 35 U.S.C. 154(b) by 232 days.

(21) Appl. No.: 16/104,116

(22) Filed: Aug. 16, 2018

(65) Prior Publication Data

US 2020/0175279 A1 Jun. 4, 2020

(30) Foreign Application Priority Data

Apr. 3, 2018 (CN) .......................... 2018 1 0290591

(51) Int. Cl.
| | |
|---|---|
| *G06K 9/00* | (2006.01) |
| *G06T 7/70* | (2017.01) |
| *G06K 9/03* | (2006.01) |
| *G06K 9/62* | (2006.01) |
| *G06T 7/20* | (2017.01) |
| *H04N 7/18* | (2006.01) |

(52) U.S. Cl.
CPC ...... *G06K 9/00711* (2013.01); *G06K 9/00288* (2013.01); *G06K 9/03* (2013.01); *G06K 9/6201* (2013.01); *G06T 7/20* (2013.01); *G06T 7/70* (2017.01); *H04N 7/183* (2013.01); *G06T 2207/10016* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 2005/0281439 | A1* | 12/2005 | Lange | G06K 9/00496 382/115 |
| 2009/0245573 | A1* | 10/2009 | Saptharishi | G06K 9/00771 382/103 |
| 2015/0117703 | A1* | 4/2015 | Peng | G06K 9/00718 382/103 |
| 2015/0169956 | A1* | 6/2015 | You | G06K 9/4604 382/103 |
| 2015/0178320 | A1* | 6/2015 | Gao | G06K 9/22 707/708 |

* cited by examiner

*Primary Examiner* — Hadi Akhavannik
(74) *Attorney, Agent, or Firm* — J. C. Patents

(57) ABSTRACT

An object recognition method and system thereof are provided. A recognition result of a first object of a $(i-1)^{th}$ frame of a video stream is obtained. A $i^{th}$ frame is received, and a second object is detected from the $i^{th}$ frame. Whether the first object and the second object are corresponding to the same target object is determined according to a position of the first object in the $(i-1)^{th}$ frame and a position of the second object in the $i^{th}$ frame. If the first object and the second object are corresponding to the same target object, whether a recognition confidence level is greater than a predetermined threshold is determined so as to perform the object recognition on the second object or assign the recognition result of the first object to the second object.

20 Claims, 6 Drawing Sheets

OBJECT RECOGNITION METHOD AND OBJECT RECOGNITION SYSTEM THEREOF

CROSS-REFERENCE TO RELATED APPLICATION

This application claims the priority benefit of China application serial no. 201810290591.9, filed on Apr. 3, 2018. The entirety of the above-mentioned patent application is hereby incorporated by reference herein and made a part of this specification.

BACKGROUND

Technical Field

The present disclosure relates to an image recognition technology, and more particularly, to an object recognition method and an object recognition system capable of recognizing the identification information of object in an image.

Description of Related Art

Object recognition technology plays a key role in the image recognition technology, and it is also one of the technologies that major research centers are devoted to develop. Most of all, the use of facial recognition technology becomes increasingly wide. Facial recognition technology is generally used in human computer interface, home video surveillance, facial recognition of biological monitoring or security monitoring such as the security check in customs, public surveillance cameras, personal computers or even bank vaults. Facial recognition technology is gradually used in common digital cameras or video cameras in recent years. Besides, since digital devices with cameras become increasingly popular, the importance of applying the facial recognition technology to all aspects of life grows.

Take the general facial recognition technology for example, after an image frame is captured, a facial region is first detected and captured from the image. Then, the facial recognition is performed on the facial region of the image frame so as to determine the identity information corresponding to each facial region. We assume the processing module requires a calculation loading of A million instructions per second (MIPS) to detect one facial region from one image frame and requires a calculation loading of B MIPS to recognize said facial region, thus, the processing module requires a calculation loading of A+B MIPS in total to recognize one face from one image frame. As such, if there are a plurality of faces to be recognized in the image frame, or if it is required to perform facial recognition subsequently in a plurality of image frames, the calculation loading of the processing module is quite large. In addition, if it is required to perform facial recognition subsequently in a plurality of continuous image frames of the video stream, the recognition probability of the recognizer may drift unstably due to interruptions by environmental factors and causes unstable recognition result of the same object.

SUMMARY

In this concern, an object recognition method and an object recognition system that significantly reduce the calculation loading and increase the stability of the object recognition are provided.

An embodiment of the present disclosure provides an object recognition method including the following steps. A $(i-1)^{th}$ frame of a video stream is received, and a first object is detected from the $(i-1)^{th}$ frame. A recognition result of the first object is obtained. A frame of a video stream is received, and a second object is detected from the $i^{th}$ frame, wherein i is an integer larger than 1. Whether the first object and the second object are corresponding to a same target object is determined according to a position of the first object in the $(i-1)^{th}$ frame and a position of the second object in the $i^{th}$ frame. If the second object and the first object are not corresponding to the same target object, the object recognition is performed on the second object. If the second object and the first object are corresponding to the same target object, whether a recognition confidence level is greater than a predetermined threshold is determined so as to either perform the object recognition on the second object or assign the recognition result of the first object to the second object.

From another perspective, an embodiment of the present disclosure provides an object recognition system including an image capturing device and a processing module. The image capturing device photographs a scene for obtaining a video stream, and the processing module is coupled to the image capturing device. The processing module receives a $(i-1)^{th}$ frame of the video stream, detects a first object from the $(i-1)^{th}$ frame and obtains a recognition result of the first object. The processing module receives a frame of the video stream and detects a second object from the $i^{th}$ frame, wherein i is an integer larger than 1. Whether the first object and the second object are corresponding to the same target object is determined according to a position of the first object in the $(i-1)^{th}$ frame and a position of the second object in the $i^{th}$ frame. If the second object and the first object are not corresponding to the same target object, the processing module performs object recognition on the second object. If the second object and the first object are corresponding to the same target object, the processing module determines whether a recognition confidence level of the target object is greater than a predetermined threshold to either perform the object recognition on the second object or assign the recognition result of the first object to the second object.

Based on the above, in an embodiment of the disclosure, the video stream includes a plurality of subsequent frames arranged in sequence on the timeline. After the object in the $(i-1)^{th}$ frame is detected and recognized, the object recognition system then determines whether the object in the $(i-1)^{th}$ frame and the object in the $i^{th}$ frame are corresponding to the same target object. If the object in the $(i-1)^{th}$ frame and the object in the $i^{th}$ frame are corresponding to the same target object, the object recognition system may, under a particular condition, chooses to assign the recognition result of the object in the $(i-1)^{th}$ frame to the object in the $i^{th}$ frame, instead of performing the calculation of object recognition again on the object in the $i^{th}$ frame. As such, it is not necessary for the object recognition system to perform the object recognition on the object on each frame of the video stream, i.e. a part of the calculation of object recognition may be omitted, such that the calculation loading of image recognition may decrease significantly and the calculation resource may be saved.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
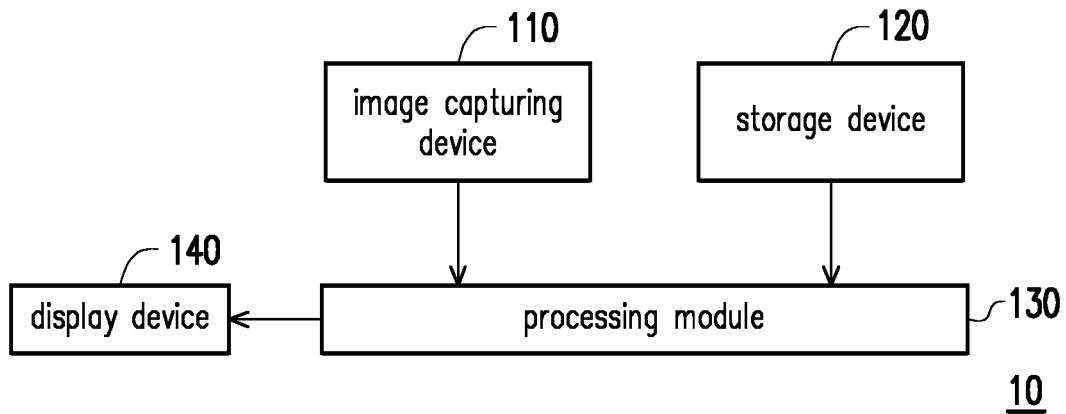
FIG. 1 is a block diagram of an object recognition system according to an embodiment of the present disclosure.

Exemplary embodiments of the present disclosure are explained in detail below with reference to the drawings. In addition, wherever possible, identical or similar reference numerals stand for identical or similar elements/components in the drawings and embodiments.

FIG. 1 is a block diagram of an object recognition system according to an embodiment of the present disclosure. It should be noted that the diagram is provided to facilitate explanation, not to limit the scope of the present disclosure. FIG. 1 firstly introduces related components and disposition relationships thereof of the object recognition system, and the detailed functions and operations are to be disclosed with reference to FIG. 2 and FIG. 3.

Referring to FIG. 1, an object recognition system 10 includes an image capturing device 110, a storage device 120, a processing module 130 and a display device 140. The processing module 130 is coupled to the image capturing device 110 and the storage device 120. In an embodiment, the object recognition system 10 may include a calculation system having the storage device 120 and the processing module 130 with the image capturing device 110 externally connected to the calculation system. For example, the object recognition system 10 may be implemented by a laptop computer or desktop computer and a video camera externally connected thereto. Alternatively, the object recognition system 10 may be implemented by a digital set top box (STB), a video camera externally connected thereto and a display, the present disclosure is not limited thereto. In another embodiment, an object recognition system 10 may also be a single electronic device in which an image capturing device 110, a storage device 120 and a processing module 130 are integrated. For example, the object recognition system 10 may be an electronic device having the function of capturing image, such as a smart phone, a tablet computer and a camera lens-embedded digital STB, the present disclosure is not limited thereto.

The image capturing device 110 is adapted to capture images of a scene and produce a video stream, the image capturing device 110 includes a camera lens having a lens and a photosensitive element. The photosensitive element is adapted to sense a light intensity of the light entering the lens and to produce an image. The photosensitive element may be, for example, a charge coupled device (CCD) a complementary metal-oxide semiconductor (CMOS) device, or other devices. However, the present disclosure is not limited thereto.

The storage device 120 is adapted to store data such as images and program codes. The storage device 120 may be a stationary or movable random access memory (RAM) in any form, a read-only memory (ROM), a flash memory, a hard disc, other similar devices, an integrated circuit or a combination of the foregoing, for example.

The processing module 130 may be a combination of a hardware device and a software device. The hardware device may be a central processing unit (CPU), a programmable microprocessor for general or special use, a digital signal processor (DSP), a programmable controller, an application specific integrated circuit (ASIC), a programmable logic device (PLD), other similar devices, or a combination of these devices, for example. The software device may be a program code or a command, etc. stored in a memory. In other words, the processing module 130 may execute the program codes stored in the storage device 120 or may execute program codes recorded by a memory built in the processing module 130; thereby each process of the object recognition method of the embodiment of the disclosure are realizable.

The display device 140 may be a display of any type, such as a liquid crystal display (LCD), a light emitting diode (LED) display, an organic light emitting diode (OLED) display, or a soft display, etc.

The image capturing device 110 is usually disposed statically at a fixed position, facing toward a particular scene, to shoot the particular scene and to produce a video stream. The image capturing device 110 provides the video stream to the calculation system composed by the processing module 130 and the storage device 120. The video stream includes a plurality of frames respectively corresponding to different timings. As such, in the embodiments of the present disclosure, by analyzing and processing the plurality of frames of the video stream, the person or object appearing in the particular scene being photographed is detected and recognized, and an identity recognition result of the person or object appearing in the particular scene being photographed is thereby obtained.

Figure 2:
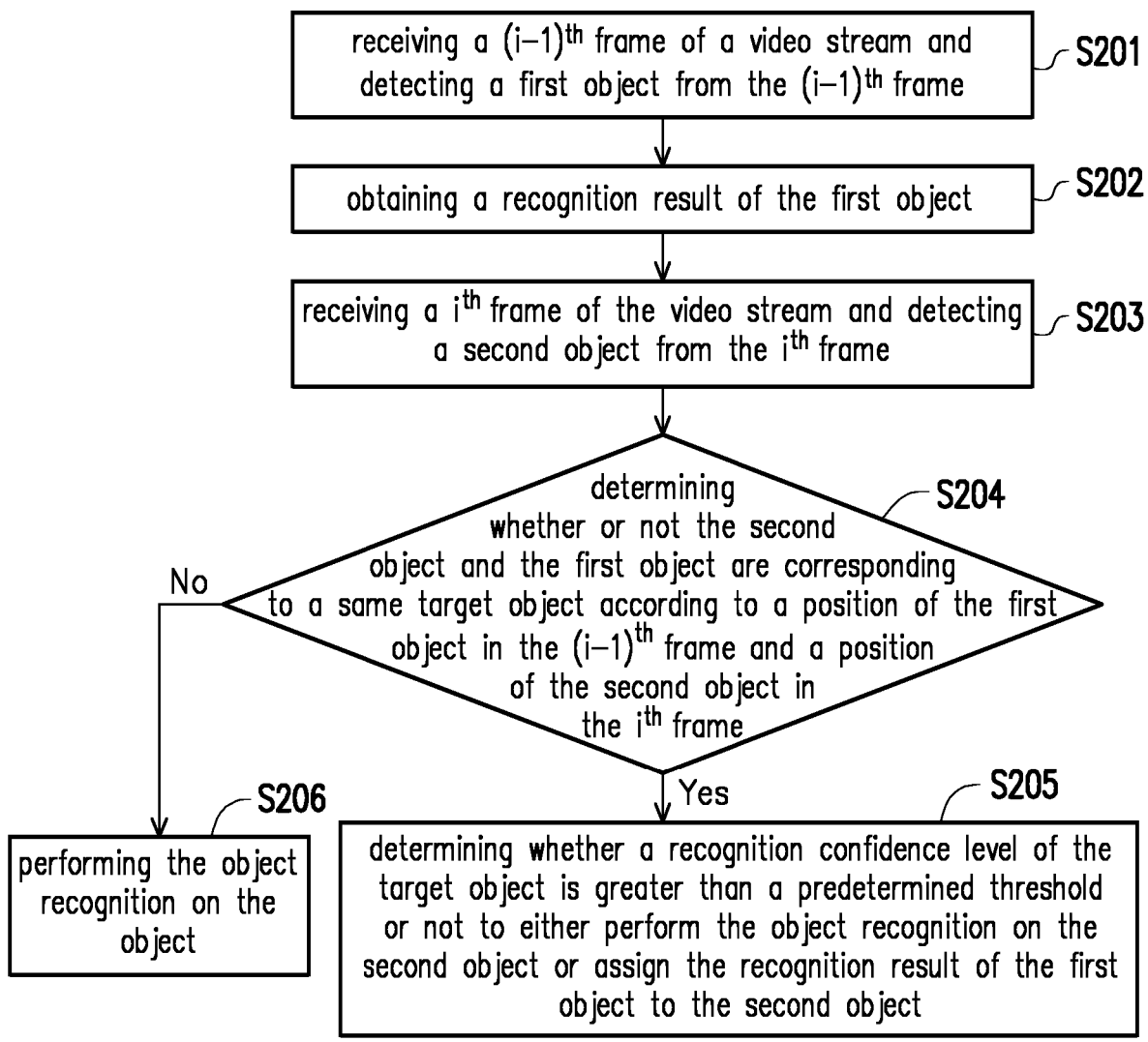
FIG. 2 is a flowchart of an object recognition method according to an embodiment of the present disclosure.

Embodiments are enumerated hereinafter with reference to each component of the object recognition system 10 of FIG. 1 to elaborate the detailed processes of the object recognition system 10 performing an object recognition method thereof. FIG. 2 is a flowchart of an object recognition method according to an embodiment of the present disclosure. Please refer to both FIG. 1 and FIG. 2.

First, in step S201, the processing module 130 receives a $(i-1)^{th}$ frame of the video stream and detects a first object from the $(i-1)^{th}$ frame. Herein, i is an integer larger than 1. In an embodiment, the processing module 130 may perform a feature detection according to object features established in advance and thereby detect an area in the $(i-1)^{th}$ frame where the first object is included. The first object detected by the processing module 130 is a target object. For example, the processing module 130 may detect an area of a human face in the $(i-1)^{th}$ frame according to human facial features (such as features of eyes, nose and mouth) established in advance. For example, the processing module 130 may perform a human face detection by Haar-like features to obtain a human face object in a frame. In another embodiment, with a feature vector trained by a deep learning model, the processing module 130 may detect an area in the $(i-1)^{th}$ frame where the first object is included. The deep learning model is a learning network implementation, such as convolution neural network (CNN) and deep neural networks (DNN), but the present disclosure is not limited thereto.

Next, in step S202, the processing module 130 obtains a recognition result of the first object. In an embodiment, after the first object is detected, the processing module 130 may obtain a region of interest (ROI) of the first object in the $(i-1)^{th}$ frame, and may perform an identity recognition of object according to the image content in the region of interest. The aforementioned region of interest is determined based on a bounding box at least sufficient to surround the first object.

In an embodiment, the processing module 130 may perform feature matching according to a plurality sets of object features established in advance and thereby obtain a recognition result of the first object. For example, by comparing the features of eyes, nose, mouth, eyebrows and ears in the region of interest with template features in a database, the processing module 130 recognizes the identity of the person being photographed. In another embodiment, with a feature vector trained by a deep learning model, the processing module 130 classifies the first object as one of a plurality kinds of sample objects and thereby obtains a recognition result of the first object. The deep learning model is a learning network implementation, such as CNN and DNN, but the present disclosure is not limited thereto. The so-called recognition result includes identification information such as an object name, a code and an object reference number.

In step S203, the processing module 130 receives a frame of the video stream and detects a second object from the $i^{th}$ frame. Similarly, by said method of object detection described above, the processing module 130 detects the second object from the $i^{th}$ frame.

In step S204, according to a position of the first object in the $(i-1)^{th}$ frame and a position of the second object in the $i^{th}$ frame, the processing module 130 determines whether the second object and the first object are corresponding to the same target object. Specifically, since the $(i-1)^{th}$ frame and the $i^{th}$ frame are two subsequent frames on the timeline, the imaging positions of the same object being photographed respectively in the $i^{th}$ frame and the $(i-1)^{th}$ frame generally satisfy some particular rules. Said rules are set depend on some factors such as frame rate and the limitation of a movement velocity of object. Based on the above, in the embodiments, according to a position of the first object in the $(i-1)^{th}$ frame and a position of the second object in the $i^{th}$ frame, the processing module 130 may determine whether the second object and the first object are corresponding to the same target object. On how to determine whether the second object and the first object are corresponding to the same target object, further elaboration is to be provided in the following embodiments.

If the second object and the first object are not corresponding to the same target object (the result of step S204 is NO), in step S206, the processing module 130 performs the object recognition on the second object. In other word, if the target object corresponding to the first object in the $(i-1)^{th}$ frame is different from the target object corresponding to the second object in the $i^{th}$ frame, the processing module 130 performs the object recognition on the second object in the $i^{th}$ frame again (such as by said calculation of image feature matching or deep learning model) so as to obtain a recognition result of the second object.

On the other hand, if the second object and the first object are corresponding to the same target object (the result of step S204 is YES), in step S205, the processing module 130 determines whether a recognition confidence level of the target object is greater than a predetermined threshold, so as to either perform the object recognition on the second object or to assign the recognition result of the first object to the second object. Furthermore, if the recognition confidence level of the target object is greater than the predetermined threshold, the processing module 130 assigns the recognition result of the first object to the second object. If the recognition confidence level of the target object is not greater than the predetermined threshold, the processing module 130 performs the object recognition on the second object by the calculation of object recognition.

In an embodiment, the recognition confidence level of the target object is a parameter value determined based on the recognition probability of each frame. The recognition probability is a recognition probability (also called a classification confidence) of a classifier, for example. In other word, the recognition confidence level of the target object may vary with alternation of the $i^{th}$ frame being processed currently. When the recognition result of the first object is obtained, the processing module 130 calculates the current recognition confidence level of the target object according to the recognition result of the first object and thereby chooses to either directly assign the recognition result of the first object to the second object or to perform the calculation process of the object recognition on the second object again.

In an embodiment, in response to the object recognition performed by the classifier, the processing module 130 calculates the recognition confidence level according to the recognition probability generated by the classifier. If the recognition probability is greater than a first probability, the processing module 130 increases the recognition confidence level. If the recognition probability is lower than a second probability, the processing module 130 decreases the recognition confidence level. The first probability is greater than the second probability. In addition, if the processing module 130 determines that the first object and the second object are not corresponding to the same target object, the processing module 130 reverts the recognition confidence level to a predetermined value, for example, reverts the recognition confidence level to 0.

As such, if the first object and the second object are determined to be corresponding to the same target object, and the recognition confidence level of the target object is accumulated to be greater than the predetermined threshold, the processing module 130 directly assigns the recognition result of the first object to the second object, and it is not required to consume calculation resource again to perform the calculation process of the object recognition on the second object. Time and loading of calculation may be significantly reduced accordingly.

It should be noted that, when the human face turns by an undue angle instead of facing right toward the lens of the image capturing device, the traditional object recognition algorithm is not capable of providing the correct recognition result. That is, the traditional object recognition algorithm may provide an incorrect recognition result or may fail to provide a recognition result because of recognition failure. Generally speaking, when the human face turns by a side rotation angle of more than about 45 degrees, even the traditional object recognition algorithm may still be able to detect it as a human face, the correct recognition probability may not be easy to get by the traditional object recognition algorithm. Based on the above, when the human face turns by a side rotation angle of more than about 45 degrees, the recognition result calculated by the traditional algorithm may not be accurate enough until the human face turns back to be within a side rotation angle of less than about 45 degrees. s, thus affects the stability of outputting the recognition result. In comparison, the object recognition system of the embodiment of the present disclosure is capable of assigning the previous recognition result to the current target object based on the recognition confidence level and the positions of the objects. Based on the above, as long as said second object is detected to be corresponding to the same target object and the recognition confidence level is sufficient, under conditions where many traditional algorithms fail to provide the correct recognition result, the object recognition system of the embodiment of the present disclosure is still capable of providing the correct recognition result stability. Said side rotation angle of about 45 degrees by which the human face turns is merely an example. The maximum of side rotation angle by which the human face turns that affects the success rate of recognition differs according to different algorithms and classifiers in practice, and the present disclosure does not intend to limit thereto.

Figure 3A:
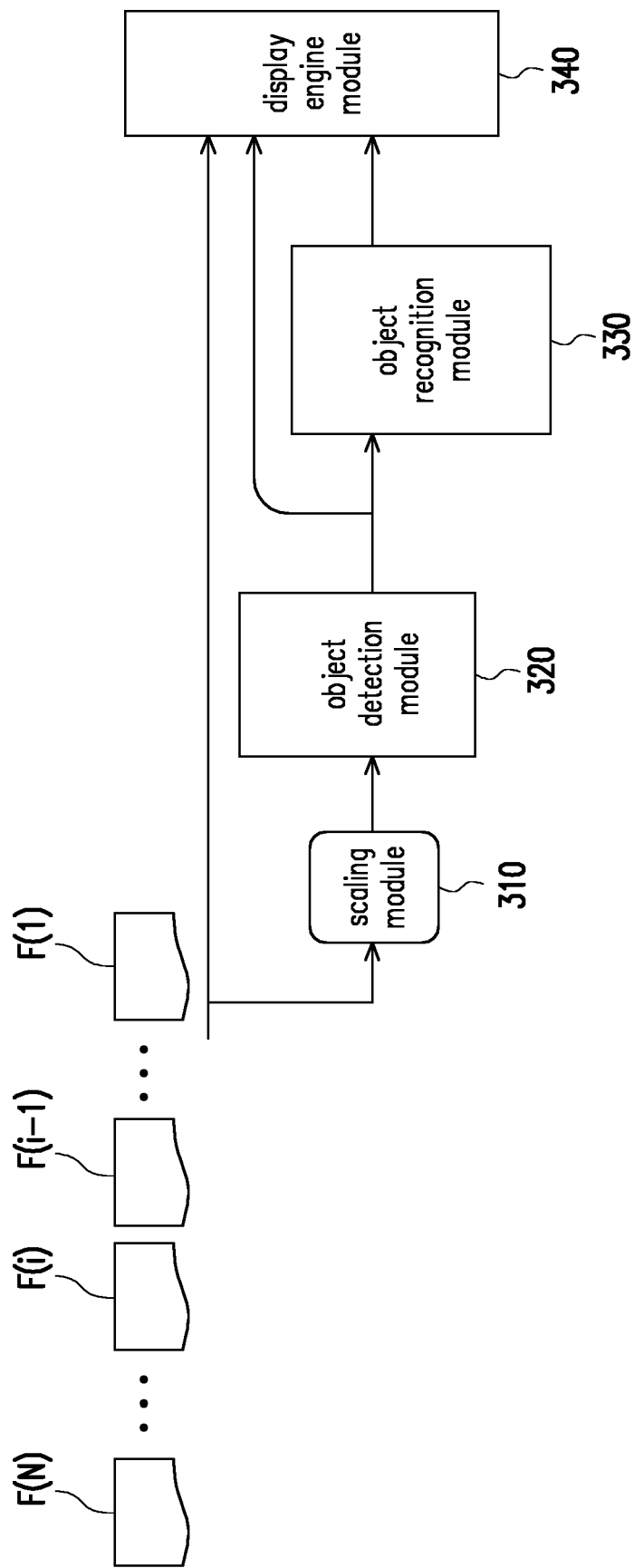
FIG. 3A is a functional block diagram of an object recognition system according to an embodiment of the present disclosure.

FIG. 3A is a functional block diagram of an object recognition system according to an embodiment of the present disclosure. Referring to FIG. 3A, the processing module 130 may be classified to a scaling module 310, an object detection module 320, an object recognition module 330 and a display engine module 340 according to different functions. The scaling module 310 obtains a plurality of frames F(1) to F(N) of the video stream in sequence from the storage device 120 or the image capturing device 110. The scaling module 310 is adapted to reduce an image size of frames F(1) to F(N), for example, to compress 1080p-resolution frames F(1) to F(N) to 480p-resolution frames F(1) to F(N), so as to reduce the required calculation loading of the subsequent object detection and recognition. The object detection module 320 detects the object from the compressed frames F(1) to F(N) and transmits coordinates of the region of interest (ROI) where the object is included to the object recognition module 330. The ROI is an image region with 60×60 pixels, for example. The object recognition module 330 generates a recognition result of the object on each of the frames F(1) to F(N) and outputs the recognition result to the display engine module 340. The display engine module 340 obtains the frames F(1) to F(N) from the storage device 120 or the image capturing device 110 and obtains the coordinates of the region of interest of the object on each of the frames F(1) to F(N) from the object detection module 320, and the recognition result of the object on each of the frames F(1) to F(N) from the object recognition module 330 in sequence, and thereby drives a display device to display the screens indicating the recognition result based on each of the frames F(1) to F(N) one by one. In this embodiment, the object detection module 320 may provide a standardized coordinates of the region of interest for the display engine module 340 to drive the display device to display the region of interest of the object in the corresponding positions of the frames F(1) to F(N) and to show the recognition result. Alternatively, the object detection module 320 or the display engine module 340 may also calculate corresponding coordinates of the region of interest in the original frames F(1) to F(N) according to the compression ratio adapted by the scaling module 310 to the frames F(1) to F(N), so as to achieve the same display result. Nevertheless, the present disclosure is not limited thereto.

Figure 3B:
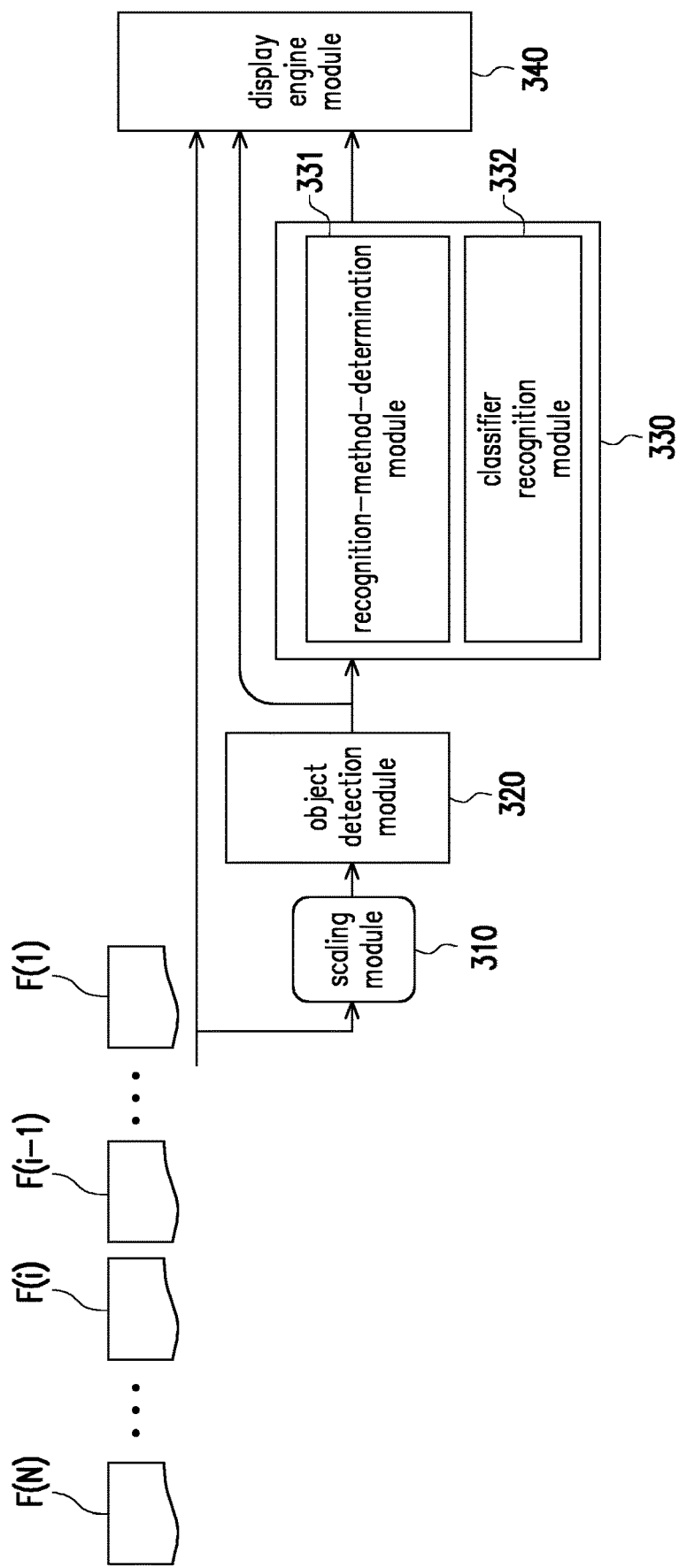
FIG. 3B is a functional block diagram of an object recognition system according to an embodiment of the present disclosure.

As described above, the object recognition module 330 may obtain the recognition result of the object according to the recognition result of the previous frame or by performing the calculation process of the object recognition again. More detailed descriptions are to be provided as below. FIG. 3B is a functional block diagram of an object recognition system according to an embodiment of the present disclosure. Referring to FIG. 3B, the object recognition module 330 may include a recognition-method-determination module 331 and a classifier recognition module 332.

The recognition-method-determination module 331 is adapted to determine a method of generating the recognition result of the object. If the recognition-method-determination module 331 determines that the object in the previous frame (for example, the $(i-1)^{th}$ frame F(i-1)) and the object in the current frame (for example, the $i^{th}$ frame F(i)) are corresponding to the same target object and the recognition confidence level is greater than the predetermined threshold, the recognition-method-determination module 331 directly assigns the recognition result of the object in the previous frame to the object in the current frame. On the other hand, If the recognition-method-determination module 331 determines that the object in the previous frame and the object in the current frame are not corresponding to the same target object or the recognition confidence level is not greater than the predetermined threshold, the classifier recognition module 332 performs the calculation process of the object recognition based on the classifier of deep learning model.

In an embodiment, in response to performing the object recognition by the classifier recognition module 332, the recognition-method-determination module 331 may determine to progressively increase or decrease the recognition confidence level of the target object according to the recognition probability generated by the classifier. In detail, the classifier used by the classifier recognition module 332 may calculates a plurality of probability values respectively corresponding to a plurality of classifying results, and classifies the object to one of the plurality of classifying results according to the highest probability value, so as to obtain a final recognition result. The highest probability value calculated by the classifier is said recognition probability described in the embodiments of the present disclosure. If the recognition probability generated by the classifier recognition module 332 is greater than the first probability, the recognition-method-determination module 331 increases the recognition confidence level. If the recognition probability generated by the classifier recognition module 332 is smaller than the second probability, the recognition-method-determination module 331 decreases the recognition confidence level. The first probability and the second probability are probability thresholds designed according to the practical use, and wherein the first probability is greater than the second probability. For example, the first probability may be 60% and the second probability may be 40%, but the present disclosure is not limited thereto.

For example, if the classifier recognition module 332 performs the object recognition on the object in the $(i-1)^{th}$ frame F(i-1), the recognition-method-determination module 331 calculates and records a current recognition confidence level $Con^{(i-1)}$ according to the recognition probability generated by classifying the object in the $(i-1)^{th}$ frame F(i-1). Then, when the recognition-method-determination module 331 attempt to determine the method for generating the recognition result of the object in the $i^{th}$ frame F(i), the recognition-method-determination module 331 determines whether to directly use the recognition result of the object in the $(i-1)^{th}$ frame F(i-1) or to perform the calculation process of the object recognition again according to the recognition confidence level $Con^{(i-1)}$ which is determined based on analyzing the frames previous to the $i^{th}$ frame F(i). Said predetermined threshold may be designed according to the practical use, but the present disclosure is not limited thereto.

An example is enumerated herein to clearly explain whether to perform the calculation process of the object recognition or not. Assuming that the first probability is set as 65%, the second probability is set as 45%, the recognition confidence level is initiated as 0, and the predetermined threshold is set as 2. Table 1 shows an example of how to obtain the recognition result of the object. However, the example in Table 1 is only used for explaining the principle of the object recognition method of this embodiment, not for limiting the present disclosure.

TABLE 1

|  | The first frame | The second frame | The third frame | The fourth frame | The fifth frame |
| --- | --- | --- | --- | --- | --- |
| Corresponding to the same object or not? |  | YES | YES | YES | NO |
| Using a classifier to perform the object recognition? | YES | YES | YES | NO | YES |
| Recognition probability | 70% | 75% | 70% |  | 60% |
| Recognition confidence level | 1 | 2 | 3 | 3 | 0 |

As shown in the example in Table 1, when the object recognition system analyzes the first frame, since no previous frame is available for determining whether the object is corresponding to the same target object, the recognition-method-determination module 331 determines to perform the object recognition on the object. Then, the classifier recognition module 332 performs the object recognition with the classifier and obtains a recognition probability of classifying the object to a specific classifying result, which is 70%. Accordingly, since the recognition probability is greater than the first probability (predetermined as 65%), the recognition-method-determination module 331 increases the recognition confidence level from 0 to 1.

Then, as shown in the example in Table 1, when the object recognition system analyzes the second frame, the recognition-method-determination module 331 determines that the object in the first frame and the object in the second frame are corresponding to the same target object, however, the recognition confidence level is not greater than the predetermined threshold (predetermined as 2) yet, so the recognition-method-determination module 331 determines to perform the object recognition on the object in the second frame. Then, the classifier recognition module 332 performs the object recognition with the classifier and obtains a recognition probability of classifying the object in the second frame to a specific classifying result, which is 75%. Accordingly, since the recognition probability is greater than the first probability (predetermined as 65%), the recognition-method-determination module 331 increases the recognition confidence level from 1 to 2.

Then, when the object recognition system analyzes the third frame, the recognition-method-determination module 331 determines that the object in the third frame and the object in the second frame are corresponding to the same target object, however the recognition confidence level is still not greater than the predetermined threshold (predetermined as 2) yet, so the recognition-method-determination module 331 determines to perform the object recognition on the object in the third frame. Then, the classifier recognition module 332 performs the object recognition with the classifier and obtains a recognition probability of classifying the object to a specific classifying result, which is 70%. Accordingly, since the recognition probability is greater than the first probability (predetermined as 65%), the recognition-method-determination module 331 increases the recognition confidence level from 2 to 3.

Then, when the object recognition system analyzes the fourth frame, the recognition-method-determination module 331 determines that the object in the fourth frame and the object in the third frame are corresponding to the same target object, and the recognition confidence level accumulated based on the first frame to the third frame is greater than the predetermined threshold (predetermined as 2), so the recognition-method-determination module 331 determines to directly assign the recognition result of the object in the third frame to the object in the fourth frame. In other word, when the fourth frame is analyzed, the classifier recognition module 332 does not perform the calculation process of the object recognition with the classifier.

Then, when the object recognition system analyzes the fifth frame, the recognition-method-determination module 331 determines that the object in the fifth frame and the object in the fourth frame are not corresponding to the same target object, so the recognition-method-determination module 331 determines to perform the object recognition on the object in the fifth frame, and to revert the recognition confidence level from 3 to 0, 0 is the predetermined value. Then, the classifier recognition module 332 performs the object recognition with the classifier and obtains a recognition probability of classifying the object to a specific classifying result, which is 60%. Accordingly, since the recognition probability is neither greater than the first probability (predetermined as 65%) nor smaller than the second probability (predetermined as 45%), the recognition-method-determination module 331 does not change the recognition confidence level, such that the recognition confidence level remains 0.

In addition, in the above example, if the object in the fifth frame is determined as the same target object as the object in the fourth frame, since the recognition confidence level remains to be 3, the recognition-method-determination module 331 still determines to directly assign the recognition result of the object in the fourth frame to the object in the fifth frame. For subsequent frames, the recognition result is also assigned according to the same method of determination until there is a frame whose object is determined to be not corresponding to the same target object as the object in the previous frame.

Figure 4:
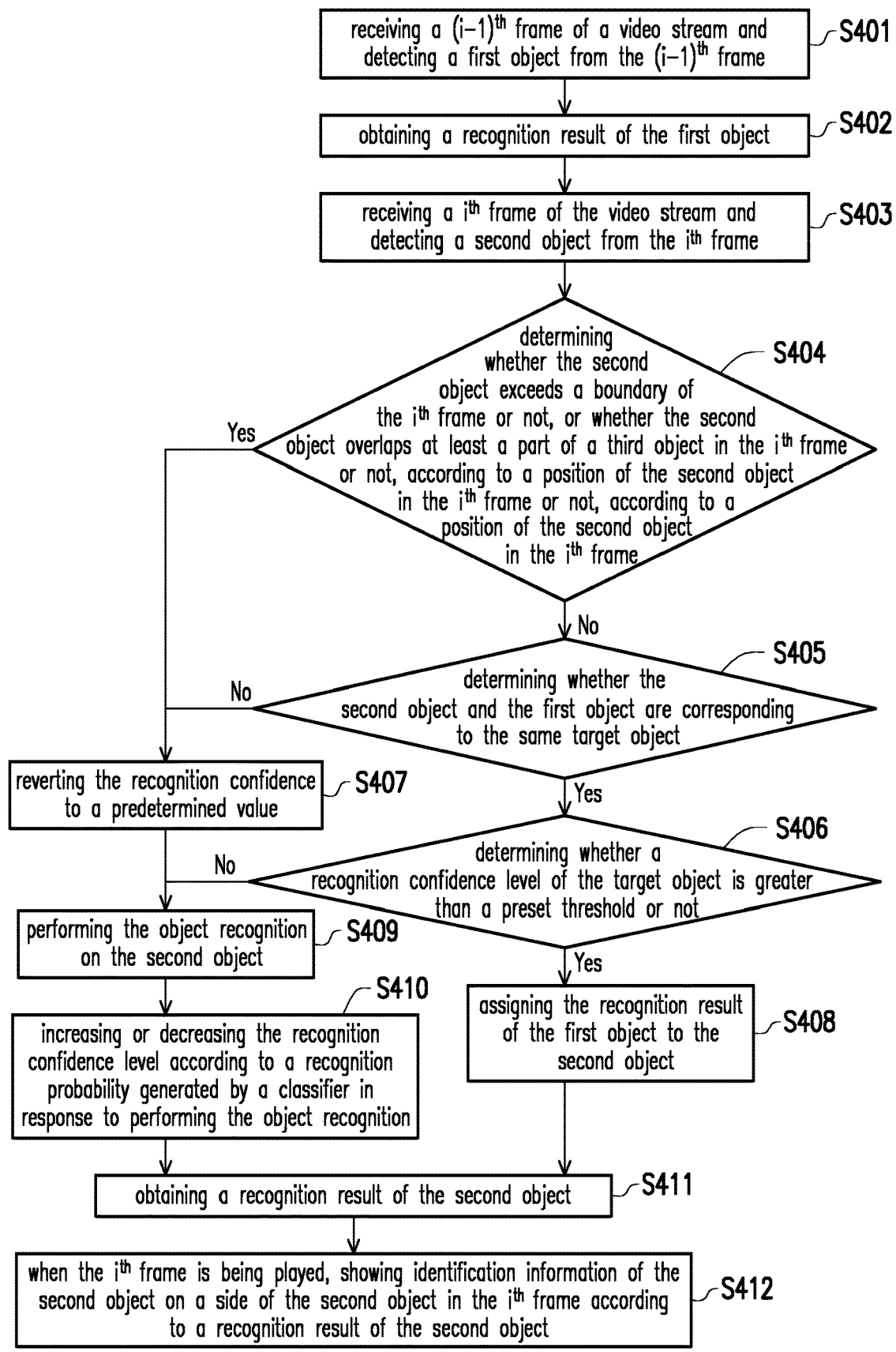
FIG. 4 is a flowchart of an object recognition method according to an embodiment of the present disclosure.

FIG. 4 is a flowchart of an object recognition method according to an embodiment of the present disclosure. Please refer to both FIG. 1 and FIG. 4.

In step S401, the processing module 130 receives a $(i-1)^{th}$ frame of the video stream and detects a first object from the $(i-1)^{th}$ frame. In step S402, the processing module 130 obtains a recognition result of the first object. In step S403, the processing module 130 receives a $i^{th}$ frame of the video stream and detects a second object from the $i^{th}$ frame.

Figure 5A:
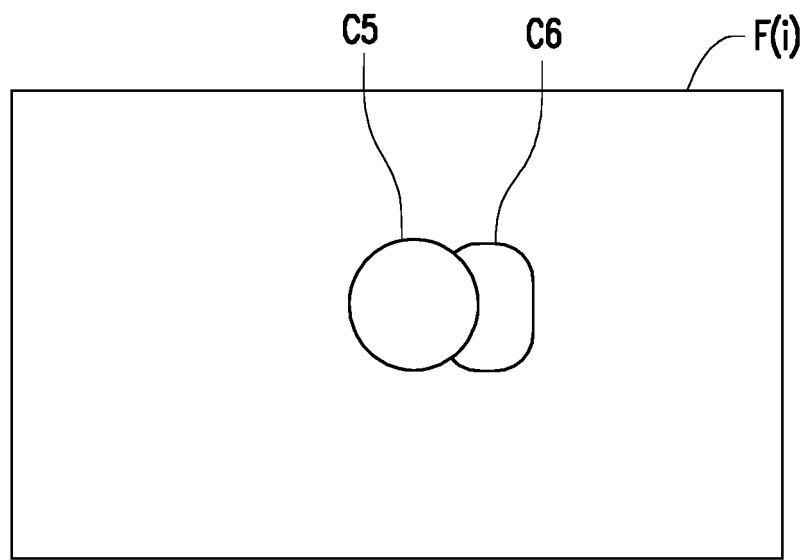
FIG. 5A is a schematic view of overlapping objects.
Figure 5B:
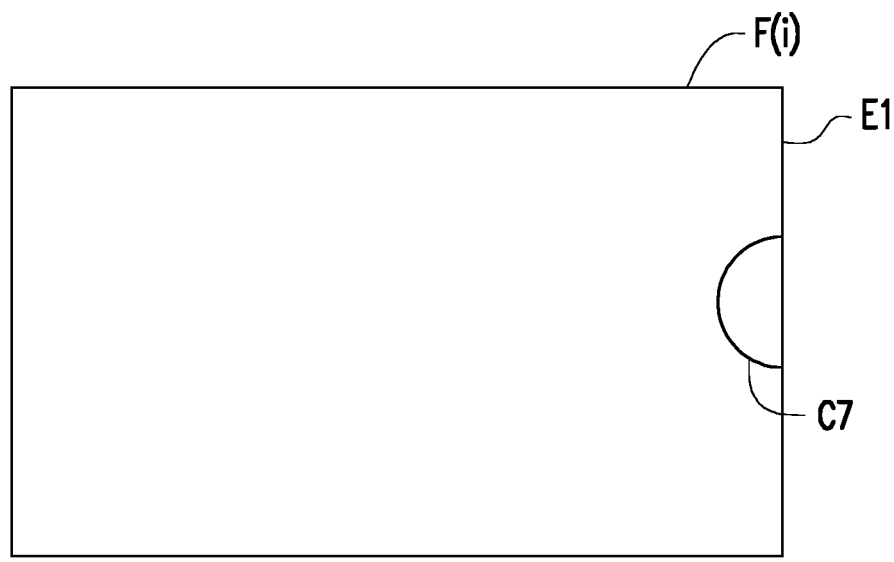
FIG. 5B is a schematic view of objects exceeding a boundary.

In step S404, the processing module 130 determines whether the second object exceeds the boundary of the $i^{th}$ frame, or whether the second object overlaps at least a part of the third object in the $i^{th}$ frame, according to a position of the second object in the $i^{th}$ frame. The processing module 130 may detect more than two objects in the same frame, and a position of each of the detected objects in the frame are detectable according to a length and a width of the corresponding bounding box (for example, both are 60 pixels) and an initial position. For example, please refer to FIG. 5A, which is a schematic view of overlapping objects. After respectively detecting a second object C5 and a third object C6 in the $i^{th}$ frame, the processing module 130 determines that the second object C5 overlaps the third object C6 according to regions covered by a bounding box of the second object C5 and a bounding box of the third object C6 respectively. FIG. 5B is a schematic view of the second object exceeding a boundary. Referring to FIG. 5B, it is known that a part of the second object C5 is positioned outside from a boundary E1 according to a length and a width of the bounding box and an initial position of the second object C5, and the processing module 130 determines that the second object C5 exceeds the boundary E1 of the $i^{th}$ frame F(i).

In the embodiment of FIG. 4, if the result of step S404 is NO, i.e. the second object neither exceeds the boundary E1 nor overlaps the other object, the processing module 130 determines whether the second object and the first object are corresponding to the same target object in step S405. Based on frame rate and reasonable limitations of a motion of the object being photographed, the processing module 130 may analyze the motion property of the objects between two frames to determine whether the first object and the second object are corresponding to the same target object. As such, the processing module 130 obtains a motion property according to the position of the first object in the $(i-1)^{th}$ frame and the position of the second object in the $i^{th}$ frame. Then, the processing module 130 determines whether the motion property satisfies a motion rule. The standard of the motion rule depends on the object being photographed and the frame rate. For example, if the object being photographed is human body, in a particular time period (the length of the particular time period depends on the frame rate), a human body should have a movement velocity, moving distance or movement direction respectively within a reasonable range. The motion property of the embodiments of the present disclosure may include a moving distance, movement velocity or motion vector calculated based on two objects on two frames. The motion rule includes a distance threshold, velocity threshold or a preset range of movement direction respectively defined according to the moving distance, movement velocity or motion vector.

Figure 6:
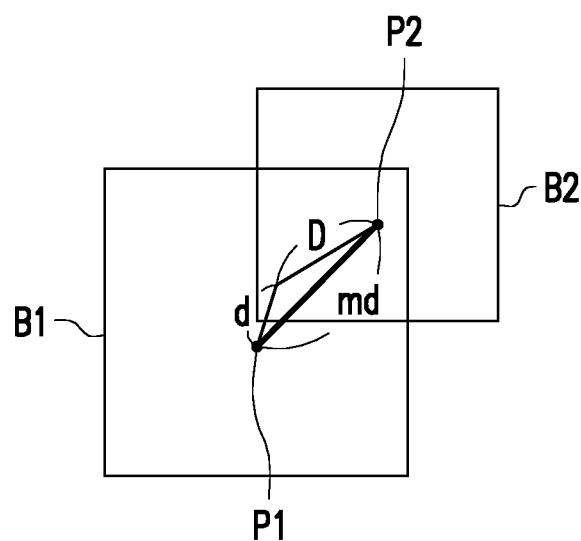
FIG. 6 is a schematic view of determining according to the motion property whether a first object and a second object are corresponding to the same target object, according to an embodiment of the present disclosure.

In an embodiment, the processing module 130 may calculate a moving distance between a first reference point of the first object and a second reference point of the second object and determine whether the moving distance is smaller than a distance threshold. For example, FIG. 6 is a schematic view of determining according to the motion property whether a first object and a second object are corresponding to the same target object, according to an embodiment of the present disclosure. Referring to FIG. 6, a first reference point P1 of the first object is a center point of a bounding box B1 of the first object, and a second reference point P2 of the second object is a center point of a bounding box B2 of the second object. The processing module 130 may calculate a depth distance d according to the size of the bounding box B1 and the bounding box B2 as well as a focal length of the lens and obtains a horizontal moving distance D.

Then, the processing module 130 may use the depth distance d and the horizontal moving distance D to calculate a moving distance md between the first reference point P1 of the first object and the second reference point P2 of the second object. The processing module 130 may determine whether the moving distance md is smaller than the distance threshold, so as to determine whether the first object and the second object are corresponding to the same target object. If the moving distance md is smaller than the distance threshold, the processing module 130 determines that the first object and the second object are corresponding to the same target object. If the moving distance md is not smaller than the distance threshold, the processing module 130 determines that the first object and the second object are not corresponding to the same target object.

In an embodiment, the processing module 130 may first calculate the moving distance between the first reference point of the first object and the second reference point of the second object, and then calculate the movement velocity according to the frame rate and the moving distance. As illustrated in the example in FIG. 6, the processing module 130 may further calculate the movement velocity by dividing the moving distance md to a reciprocal of the frame rate, as shown in Equation (1).

$$v = \frac{\sqrt{D^2 + d^2}}{\left(\frac{1}{F}\right)}$$

wherein v is the movement velocity, D is the horizontal moving distance, d is the depth distance, and F is the frame rate.

Then, the processing module 130 may determine whether the movement velocity is smaller than the speed threshold, so as to determine whether the first object and the second object are corresponding to the same target object. If the movement velocity is smaller than the speed threshold, the processing module 130 determines that the first object and the second object are corresponding to the same target object. If the movement velocity is not smaller than the speed threshold, the processing module 130 determines that the first object and the second object are not corresponding to the same target object.

In an embodiment, the processing module 130 may calculate the motion vector between the first object and the second object and determine whether a direction of the motion vector falls within the preset range. The processing module 130 may, for example, calculate the motion vector between the first object and the second object on two adjacent frames by comparing the object features of the object in the bounding box B1 and the object features of the object in the bounding box B2. The processing module 130 may determine whether a motion path corresponding to the motion vector is reasonable by determining whether the direction of the motion vector falls within the preset range, and thereby determine whether the first object and the second object are corresponding to the same target object. The above several specific ways of using the motion property and the motion rule to determine whether the first object and the second object are corresponding to the same target object are merely examples, and the present disclosure is not limited thereto.

Referring to the flowchart of FIG. 4 again, if the result of step S405 is YES, in step S406, the processing module 130 determines whether a recognition confidence level corresponding to the target object is greater than a predetermined threshold. If the result of step S406 is YES, in step S408, the processing module 130 assigns the recognition result of the first object obtained in step S402 to the second object. Specifically, the processing module 130 designates the identification information, such as an object name, a code and an object reference number, corresponding to the first object to be the identification information of the second object. If the result of step S406 is NO, the processing module 130 performs step S409 and performs the calculation process of the object recognition on the second object.

In the embodiment of FIG. 4, if it is determined in step S404 that the second object overlaps the third object or the second object exceeds the boundary E1 of the $i^{th}$ frame, in addition to performing the object recognition on the second object, the processing module 130 also reverts the recognition confidence level to the predetermined value. Besides, if it is determined in step S405 that the first object and the second object are not corresponding to the same target object, the processing module 130 also reverts the recognition confidence level to the predetermined value and performs the object recognition on the second object.

As such, if the result of step S404 is YES, or if the result of step S405 is NO, the processing module 130 performs step S407 by reverting the recognition confidence level to the predetermined value and performs the object recognition on the second object in step S409.

After the object recognition of step S409 is completed, in step S410, the processing module 130 increases or decreases the recognition confidence level according to the recognition probability generated by the classifier in response to performing the object recognition.

Figure 7:
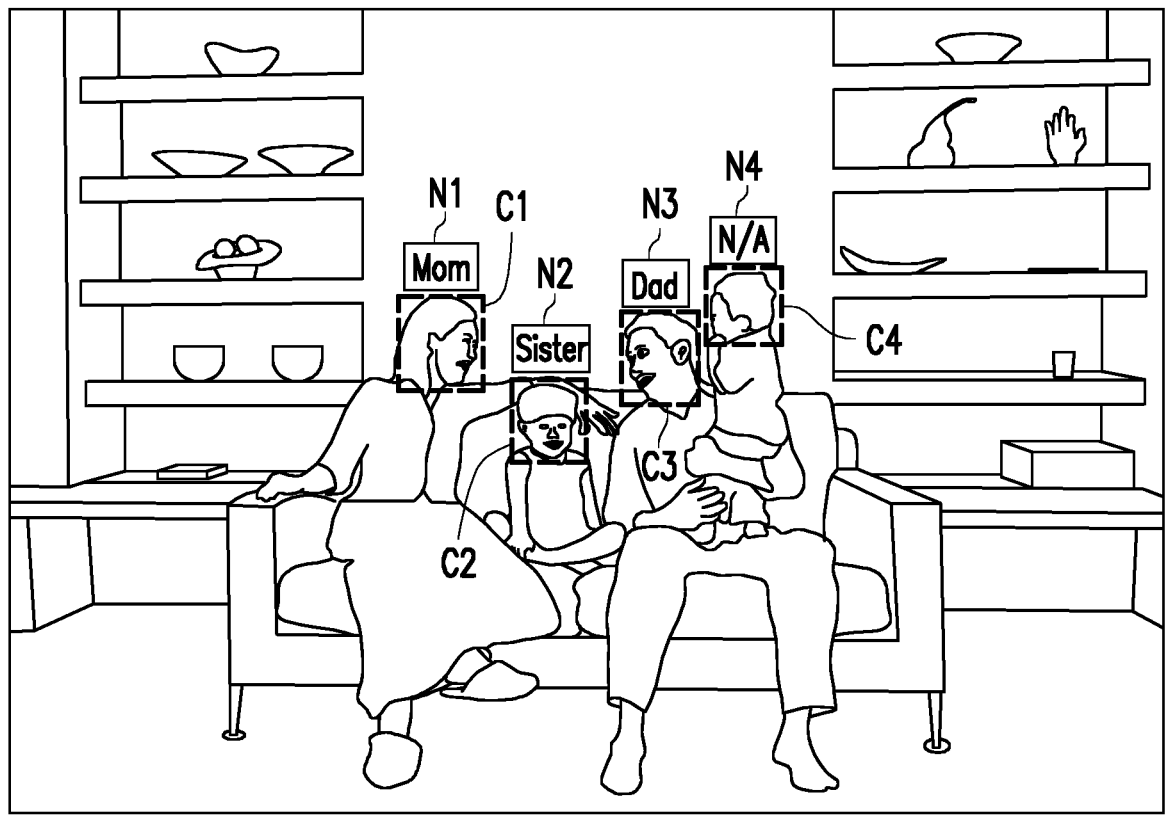
FIG. 7 is a schematic view of a playable frame according to an embodiment of the present disclosure.

In step S411, the processing module 130 obtains a recognition result of the second object, the recognition result of the second object may be a result generated by performing step S408 or step S409. In step S412, when the $i^{th}$ frame is being played, according to the recognition result of the second object, the processing module 130 shows the identification information of the second object on a side of the second object in the $i^{th}$ frame with the display device 140. For example, FIG. 7 is a schematic view of a playable frame according to an embodiment of the present disclosure. In the example shown in FIG. 7, the object is a human face. when the $i^{th}$ frame is being played, according to recognition results of three second objects C1 to C3, the processing module 130 may mark identification information N1 to N3 (such as object names) of the second objects C1 to C3 respectively on a side of the second objects C1 to C3 in the $i^{th}$ frame through the display device 140. However, if the identification information of an object C4 is not obtained successfully (possibly because the human face is unregistered or turns by an angle too great), the processing module 130 may show a notification N4 indicating that the object C4 is unrecognizable on a side of the second object C4 in the $i^{th}$ frame.

However, FIG. 4 is adapted to illustrate the process of the object recognition system obtaining the recognition result of the object in the $i^{th}$ frame. In view of the descriptions of FIG. 3 and FIG. 4, the process of FIG. 4 may be performed repeatedly so as to obtain the recognition result of the object on each frame. For example, the recognition result of the first object obtained in step S402 may be generated by image recognition or be assigned the recognition result of the object in the previous frame.

In sum of the above, in the embodiments of the present disclosure, under the condition that the objects on a plurality of subsequent frames all are corresponding to the same target object, the recognition confidence level often continues to accumulate. Once the recognition confidence level accumulates to reach the predetermined threshold, under the condition that the objects in the subsequent frames all are corresponding to the same target object, the object recognition system of the embodiments of the present disclosure obtains the recognition result of the object with stability merely by performing object detection and confirming the position and motion information of the object. The heavy-loading calculation process of the object recognition is omitted when analyzing a part of the frames and the time and resource consumed by calculation may be significantly reduced thereby. The loading of the processor of the object analyzing system is reduced as well. In addition, by the calculation of the recognition confidence level, the recognition results of the plurality of frames of the video streams provided by the object recognition system are not easily affected by environmental factors and thereby increase the stability of the object recognition system.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An object recognition method, comprising:
    receiving a $(i-1)^{th}$ frame of a video stream and detecting a first object from the $(i-1)^{th}$ frame;
    obtaining a recognition result of the first object;
    receiving a $i^{th}$ frame of the video stream and detecting a second object from the $i^{th}$ frame, wherein i is an integer greater than 1;
    determining whether the second object and the first object are corresponding to a same target object according to a position of the first object in the $(i-1)^{th}$ frame and a position of the second object in the $i^{th}$ frame;
    if the second object and the first object are not corresponding to the same target object, performing an object recognition on the second object;
    if the second object and the first object are corresponding to the same target object, determining whether a recognition confidence level of the target object is greater than a predetermined threshold to either perform the object recognition on the second object or assign the recognition result of the first object to the second object; and
    increasing or decreasing the recognition confidence level according to a recognition probability generated by a classifier in response to performing the object recognition using the classifier,
    wherein if the second object and the first object are corresponding to the same target object and the recognition confidence level of the target object is greater than the predetermined threshold, omitting calculation of the object recognition on the second object and assigning the recognition result of the first object in the $(i-1)^{th}$ frame to the second object in the $i^{th}$ frame.

2. The object recognition method according to claim 1, wherein the step of determining whether the recognition confidence level of the target object is greater than the predetermined threshold to either perform the object recognition on the second object or assign the recognition result of the first object to the second object comprises:
    if the recognition confidence level of the target object is not greater than the predetermined threshold, performing the object recognition on the second object.

3. The object recognition method according to claim 1, further comprising:
    if the second object and the first object are not corresponding to the same target object, reverting the recognition confidence level to a predetermined value.

4. The object recognition method according to claim 1, wherein after receiving the $i^{th}$ frame of the video stream and detecting the second object from the $i^{th}$ frame, the object recognition method further comprises:

determining whether the second object exceeds a boundary of the $i^{th}$ frame, or whether the second object overlaps at least a part of a third object in the $i^{th}$ frame, according to a position of the second object in the $i^{th}$ frame;

if the second object exceeds the boundary of the $i^{th}$ frame or overlaps the third object, performing the object recognition on the second object; and if the second object does not exceed the boundary of the $i^{th}$ frame or does not overlap the third object, determining whether the second object and the first object are corresponding to the same target object according to the position of the first object in the $(i-1)^{th}$ frame and the position of the second object in the $i^{th}$ frame.

5. The object recognition method according to claim 4, further comprising:

if the second object exceeds the boundary of the $i^{th}$ frame or overlaps the third object, reverting the recognition confidence level to a predetermined value.

6. The object recognition method according to claim 4, wherein if the recognition probability is greater than a first probability, increasing the recognition confidence level, if the recognition probability is smaller than a second probability, decreasing the recognition confidence level, the first probability is greater than the second probability.

7. The object recognition method according to claim 1, wherein if the recognition probability is greater than a first probability, increasing the recognition confidence level, if the recognition probability is smaller than a second probability, decreasing the recognition confidence level, and the first probability is greater than the second probability.

8. The object recognition method according to claim 1, wherein the step of determining whether the second object and the first object are corresponding to the same target object according to the position of the first object in the $(i-1)^{th}$ frame and the position of the second object in the $i^{th}$ frame comprises:

obtaining a motion property according to the position of the first object in the $(i-1)^{th}$ frame and the position of the second object in the $i^{th}$ frame; and determining whether the motion property satisfies a motion rule.

9. The object recognition method according to claim 1, further comprising:

when the $i^{th}$ frame is being played, showing an identification information of the second object on a side of the second object in the $i^{th}$ frame according to a recognition result of the second object.

10. The object recognition method according to claim 1, wherein the first object and the second object are human faces, and the object recognition is a facial recognition.

11. An object recognition system, comprising:

an image capturing device, photographing a scene for obtaining a video stream; and a processing module, coupled to the image capturing device, wherein the processing module receives a $(i-1)^{th}$ frame of the video stream, detects a first object from the $(i-1)^{th}$ frame and obtains a recognition result of the first object, wherein the processing module receives a $i^{th}$ frame of the video stream and detects a second object from the $i^{th}$ frame, wherein i is an integer greater than 1, wherein the processing module determines whether the second object and the first object are corresponding to a same target object according to a position of the first object in the $(i-1)^{th}$ frame and a position of the second object in the $i^{th}$ frame, wherein, if the second object and the first object are not corresponding to the same target object, the processing module performs an object recognition on the second object; and if the second object and the first object are corresponding to the same target object, the processing module determines whether a recognition confidence level of the target object is greater than a predetermined threshold to either perform the object recognition on the second object or assign the recognition result of the first object to the second object, wherein the processing module increases or decreases the recognition confidence level according to a recognition probability generated by a classifier in response to performing the object recognition using the classifier, wherein if the second object and the first object are corresponding to the same target object and the recognition confidence level of the target object is greater than the predetermined threshold, the processing module omits calculation of the object recognition on the second object and assigns the recognition result of the first object in the $(i-1)^{th}$ frame to the second object in the $i^{th}$ frame.

12. The object recognition system according to claim 11, wherein if the recognition confidence level of the target object is not greater than the predetermined threshold, the processing module performs the object recognition on the second object.

13. The object recognition system according to claim 11, wherein, if the second object and the first object are not corresponding to the same target object, the processing module reverts the recognition confidence level to a predetermined value.

14. The object recognition system according to claim 11, wherein the processing module determines whether the second object exceeds a boundary of the $i^{th}$ frame, or whether the second object overlaps at least a part of a third object in the $i^{th}$ frame, according to a position of the second object in the $i^{th}$ frame; and if the second object exceeds the boundary of the $i^{th}$ frame or overlaps the third object, the processing module performs the object recognition on the second object, wherein, if the second object does not exceed the boundary of the $i^{th}$ frame or does not overlap the third object, the processing module determines whether the second object and the first object are corresponding to the same target object according to the position of the first object in the $(i-1)^{th}$ frame and the position of the second object in the $i^{th}$ frame.

15. The object recognition system according to claim 14, wherein if the second object exceeds the boundary of the $i^{th}$ frame or overlaps the third object, the processing module reverts the recognition confidence level to a predetermined value.

16. The object recognition system according to claim 14, wherein if the recognition probability is greater than a first probability, the processing module increases the recognition confidence level; and if the recognition probability is smaller than a second probability, the processing module decreases the recognition confidence level, the first probability is greater than the second probability.

17. The object recognition system according to claim 11, wherein if the recognition probability is greater than a first probability, the processing module increases the recognition confidence level; and if the recognition probability is smaller than a second probability, the processing module decreases the recognition confidence level, the first probability is greater than the second probability.

18. The object recognition system according to claim 10, wherein the processing module obtains a motion property according to the position of the first object in the $(i-1)^{th}$ frame and the position of the second object in the $i^{th}$ frame, and determines whether the motion property satisfies a motion rule.

19. The object recognition system according to claim 10, further comprising: a display device, wherein when the $i^{th}$ frame is being played by the display device, the display device displays an identification information of the second object on a side of the second object in the $i^{th}$ frame according to a recognition result of the second object.

20. The object recognition system according to claim 10, wherein the first object and the second object are human faces, and the object recognition is a facial recognition.

* * * * *